No. 727,991. PATENTED MAY 12, 1903.
S. W. MILLER.
SIPHON.
APPLICATION FILED DEC. 15, 1902.
NO MODEL.
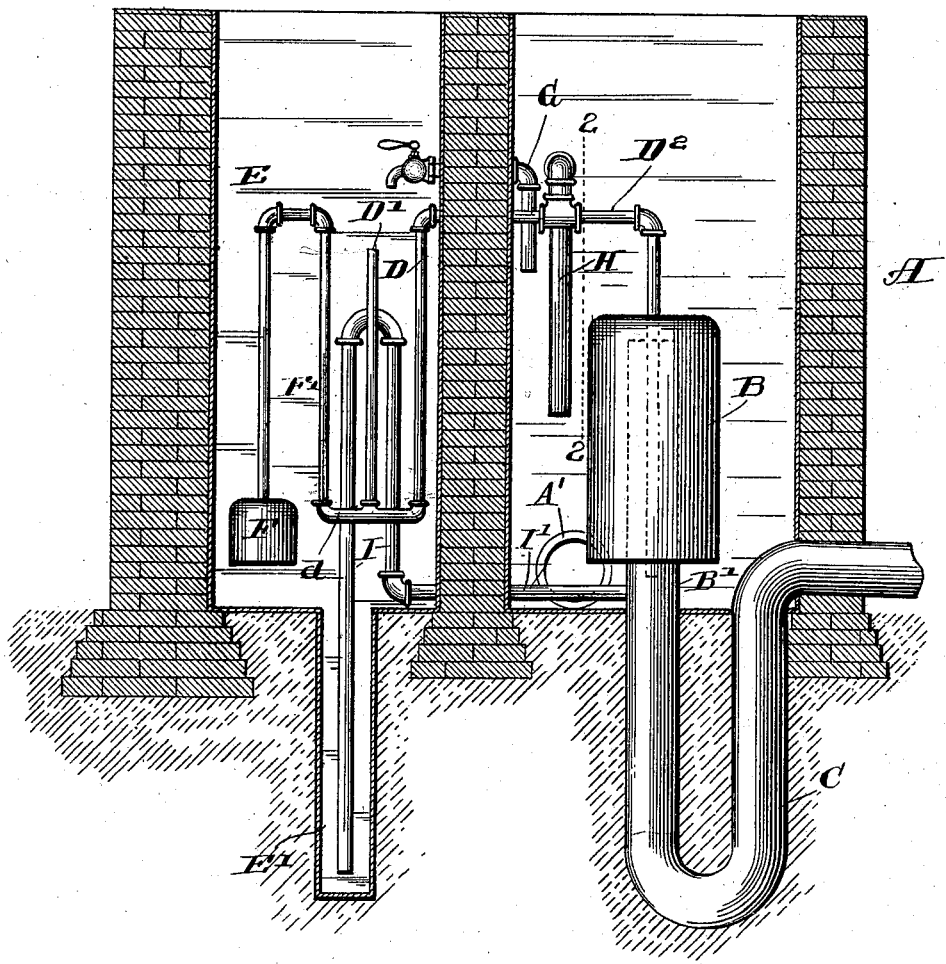
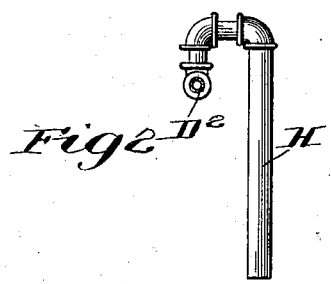
Witnesses:
Carl M. Crawford
William H. Hall
Inventor:
Sidney W. Miller
by Poole & Brown
his Attorneys No. 727,991. Patented May 12, 1903.

UNITED STATES PATENT OFFICE.

SIDNEY W. MILLER, OF CHICAGO, ILLINOIS.

SIPHON.

SPECIFICATION forming part of Letters Patent No. 727,991, dated May 12, 1903.

Application filed December 15, 1902. Serial No. 135,190. (No model.)

*To all whom it may concern:*

Be it known that I, SIDNEY W. MILLER, of Chicago, in the county of Cook and State of Illinois, have invented certain new and useful Improvements in Siphons; and I do hereby declare that the following is a full, clear, and exact description thereof, reference being had to the accompanying drawings, and to the letters of reference marked thereon, which form a part of this specification.

This invention relates to improvements in siphons for automatically discharging the contents of liquid-tanks, and refers more specifically, first, to an improved double-trapped siphon, or one having in addition to a trapped outlet-limb an auxiliary trap having a less depth of seal than the main trap and the forcing of which sets the siphon into operation, and, secondly, to a time-siphon apparatus designed to intermittently discharge a liquid tank or receptacle in such manner that the tank or receptacle after it has once been filled remains filled for a determined period and is thereafter automatically discharged through said siphon. The construction, so far as it relates to a time-siphon, is applicable for use to intermittently discharge the contents of a filter or bacteria-bed constituting part of a sewage-purifying plant, though it is obvious that the apparatus or modifications thereof may be employed wherever it is desired to intermittently charge or discharge a liquid tank or receptacle.

In the drawings, Figure 1 is a vertical section of an apparatus embodying the features constituting my invention. Fig. 2 is a detail taken on line 2 2 of Fig. 1.

As shown in said drawings, A designates a tank which may constitute a part of or be connected with a tank containing a filter or contact-bed in which sewage after leaving the septic tank is exposed for determined periods. As herein shown, the tank A is designed to be made separate from the contact-bed and is provided with an inlet-pipe A', leading from a contact-bed tank. (Not shown.) The tank A is emptied by the apparatus illustrated, consisting of a typical form of deep-seal siphon, comprising an intake or shorter limb B, an outlet or longer limb B', and a deep trap C, through which the longer leg of the siphon empties, said trap being designed to discharge into a conduit leading to a suitable place for the disposal of the liquid. The trap C of said siphon is so proportioned that the maximum depth of liquid which the tank is designed to receive does not produce sufficient head or pressure to set the siphon into operation. The liquid-head in the tank A is supplemented by pressure applied through the medium of an auxiliary pressure device, as will hereinafter more fully appear, and said auxiliary device is arranged to be brought into operation at a predetermined period after the tank A has been filled, so that said tank A after being filled remains filled for a desired length of time.

Communicating with the siphon is an auxiliary trap, comprising a longer limb D and a shorter limb D', which are connected at the lower end of the trap by a short transverse pipe $d$. The longer limb of the trap communicates with the siphon by means of a connecting-pipe $D^2$, which may enter the siphon at any suitable place, but is shown herein as curved downwardly, and extends through the bell or shorter limb of the siphon and a distance into the longer limb thereof. Said auxiliary trap is shown as located in a chamber E at one side of the tank A and which contains the timing mechanism hereinafter to be described, though the trap may be otherwise located. Said auxiliary trap, as before stated, has a less depth of seal than that of the main trap.

The auxiliary or supplemental pressure relied upon to set the siphon into operation is applied directly to the auxiliary trap, and such application of pressure is applied by devices made as follows: F designates a downwardly-opening bell located in the chamber E, said bell in practice being supported in any suitable manner in said chamber. F' designates an inverted-U-shaped pipe, one end of which communicates with the top of the bell F and the other end of which communicates with the auxiliary trap, being herein shown as communicating with the bottom connection-pipe $d$ of the auxiliary trap. The upper or closed part of said pipe extends above the maximum level to which the liquid rises in the chamber E, so as to prevent flooding of the trap through the bell and connecting-pipe. Said tank E is filled from the main tank A by means of a pipe G, one end of which is submerged in the liquid of the tank A when the latter is filled or nearly filled. Said filling-pipe is provided with a valve, whereby the period of time required for filling the tank E therethrough may be varied for the purpose of producing corresponding variations of time in which the tank A remains filled.

In the operation of the device as thus far described the tank A is filled; but the pressure due to the liquid-head therein is not sufficient to set the siphon in operation to empty the same. After the tank A is filled above the level of the highest part of the filling-pipe G the chamber E begins filling from the tank A, and as the liquid rises in the tank E and submerges the bell F pressure is exerted in said bell and pipe F' and is transmitted through said pipe to the auxiliary trap. The liquid continues to rise in said chamber E until sufficient pressure is generated in said bell and pipe F' to force the auxiliary trap, at which time pressure in the siphon is released through said auxiliary trap and the siphon set in operation. Thereafter the tank A is emptied through said siphon in the usual manner.

Means are provided for refilling the auxiliary trap after the air in the siphon has escaped therethrough, and, as herein shown, said trap is filled from the liquid in the tank A prior to the passage of the liquid into said siphon. Such refilling means consists of a pipe H, communicating with the pipe $D^2$, which connects the auxiliary trap with the siphon, said pipe H depending from said connecting-pipe and being submerged in the liquid of said tank when said tank is filled. Said pipe H and the connecting-pipe $D^2$ are wholly submerged in the liquid contents of the tank A when the latter is filled to its maximum level, so that after the auxiliary trap is forced and the siphon begins operation the liquid rushes through the pipes H and $D^2$ and refills the auxiliary trap. Said refilling-pipe H is shown in Fig. 2 as extending a distance above said connecting-pipe, so as to insure that liquid from the tank A will not fill the auxiliary trap prior to a sufficient evacuation of air from the siphon through said auxiliary trap, and is made larger than the pipe $D^2$, so that although water passes both ways in the pipe $D^2$ from the pipe H a sufficient quantity will be directed to the auxiliary trap to properly fill the same. It will be observed that the pipe H constitutes not only a refilling-pipe for the auxiliary trap, but constitutes, in connection with the pipe $D^2$, a venting device, whereby the siphon is vented after each operation thereof.

The feature of my device just described is claimed in a copending application filed by me on the 24th day of November, 1902, Serial No. 132,546.

Means are provided for emptying the timing-chamber E after each operation of the siphon to empty the tank A. Such emptying of the timing-tank is effected through a siphon I, which discharges the contents of the chamber through the main siphon. Said siphon I communicates with the main siphon through the medium of a pipe I', which enters the longer limb of the main siphon, as herein shown, above the sealing-level of the trap C. The intake-limb of said siphon I is shown as continued downwardly below the level of the floor of the chamber E into a well E' a sufficient distance to seal the same and prevent the escape of air from the main siphon therethrough. The pipe I' of the timing-chamber siphon may enter the trap of the main siphon below the sealing-level thereof, in which event the outlet-limb of the siphon I may be made of such length that the column of liquid therein will overbalance the maximum pressure in the siphon, and thereby prevent the escape of air from the main siphon through the timing-chamber siphon. In the construction last mentioned the intake-limb of the timing-chamber siphon need not be sealed. The arrangement herein shown is a preferable one, however, as it avoids the embedding of the connecting-pipe I' in the concrete foundation of the apparatus, such as would be necessary if said pipe entered the trap of the main siphon below the sealing-level thereof.

So far as is concerned the use with the main siphon of an auxiliary trap which is adapted to be refilled from the liquid in the tank A before the passage thereof into the siphon which empties said tank the means for supplementing the pressure of the auxiliary trap may be varied. Moreover, the auxiliary trap may be located otherwise than in the timing-chamber, as shown. Other changes may be made in the structural details illustrated, and I do not wish to be limited to such details except as hereinafter made the subject of specific claims. It is to be furthermore understood that the combinations set forth in the several claims are intended to be separately claimed without reference to the structure in connection with which they are illustrated and not mentioned in such claims.

I claim as my invention—

1. The combination with a tank and a siphon for emptying the same and having a trapped discharge-limb, of an auxiliary trap for said siphon having a less depth of seal than that of the main trap of the siphon, means for refilling said auxiliary trap after each operation of the siphon from the liquid in the tank before it has passed into the siphon, and a supplemental pressure device connected directly with said auxiliary trap for forcing the trap and thereby starting the siphon into operation.

2. The combination with a tank and a siphon for emptying the same and having a trapped discharge-limb, of an auxiliary trap for said siphon having a less depth of seal than that of the main trap of the siphon, means for refilling said auxiliary trap after each operation of the siphon from the liquid in the tank before it has passed into the siphon, and a supplemental pressure device connected directly with the auxiliary trap and controlled by the liquid supplied from said tank for forcing the said auxiliary trap and thereby starting the siphon into operation.

3. The combination with a tank and a siphon for emptying the same having a trapped discharge-limb, of a timing-chamber which is filled from said tank, an auxiliary trap for said siphon, having a less depth of seal than that of the main trap of the siphon, means for refilling said auxiliary trap after each operation of the siphon from the liquid in said tank prior to its passage to said siphon, a downwardly-opening bell located in said chamber, and a pipe connected at one end with said bell and at its other end with said auxiliary trap.

4. The combination with a tank and a siphon for emptying the same having a trapped discharge-limb, of a timing-chamber which is filled from said tank, an auxiliary trap having a less depth of seal than that of the main trap of the siphon, means for refilling said auxiliary trap, a downwardly-opening bell located in said chamber, a pipe connected at one end with said bell and at its other end with said auxiliary trap, and means independent of said bell for emptying said tank during each operation of the siphon.

5. The combination with a tank and a siphon for emptying the same having a trapped discharge-limb, of a timing-chamber which is filled from said tank, an auxiliary trap connected with said siphon and having a less depth of seal than that of the main trap of the siphon, a downwardly-opening bell located in said chamber, a pipe connected at one end with said bell and at its other end with said auxiliary trap, and a siphon located in said chamber and connected with the main siphon for emptying said chamber.

6. The combination with a tank and a siphon for emptying the same having a trapped discharge-limb, of a timing-chamber which is filled from said tank, an auxiliary trap connected with said siphon and having a less depth of seal than that of the main trap of said siphon, a downwardly-opening bell located in said chamber, a pipe connected at one end with said bell and at its other end with said auxiliary trap, a siphon located in said chamber and connected with the main siphon for emptying said chamber, and means for sealing the siphon which empties said chamber.

7. The combination with a tank and a siphon for emptying the same having a trapped discharge-limb, of a timing-chamber which is filled from said tank, an auxiliary trap connected with said siphon and having a less depth of seal than that of the main trap of the siphon, means for refilling said auxiliary trap after each operation of the siphon from the liquid in the tank before its passage into the siphon, a downwardly-opening bell located in said chamber, a pipe connected at one end with said bell and at its other end with said auxiliary trap, and a second siphon located in said chamber and connected with the main siphon for emptying said chamber.

8. The combination with a tank and a siphon for emptying the same having a trapped discharge-limb, of a timing-chamber which is filled from said tank, an auxiliary trap connected with said siphon and having a less depth of seal than that of the main trap of the siphon, means for refilling said auxiliary trap after each operation of the siphon, a downwardly-opening bell located in said chamber, a pipe connected at one end with said bell and at its other end with said auxiliary trap, and a second siphon located in said chamber and connected with the main siphon for emptying said chamber, said chamber being provided with a well and the receiving end of the second siphon being adapted to extend into said well.

9. The combination with a tank and a siphon for emptying the same having a trapped discharge-limb, of a timing-chamber which is filled from said tank, an auxiliary trap located in said chamber and connected with said siphon, a supplemental pressure device located in said chamber and connected directly with the auxiliary trap for forcing the same to start the siphon into operation, and means for emptying said auxiliary tank through said siphon.

10. The combination with a tank and a siphon for emptying the same having a trapped discharge-limb, of an auxiliary trap for said siphon, a pipe connecting said auxiliary trap with the siphon, and means for refilling said trap from the liquid in said tank, comprising a pipe communicating with the pipe connecting the auxiliary trap with the siphon and adapted to be submerged in the liquid in said tank when the latter is filled, said filling-pipe extending a distance above said connecting-pipe.

In testimony that I claim the foregoing as my invention I affix my signature, in presence of two witnesses, this 5th day of December, A. D. 1902.

SIDNEY W. MILLER.

Witnesses:
WILLIAM L. HALL,
GERTRUDE BRYCE.